(12) United States Patent
Chaudhari et al.

(10) Patent No.: US 11,046,868 B2
(45) Date of Patent: Jun. 29, 2021

(54) METHOD AND COMPOSITION FOR A STABLE OIL-IN-WATER EMULSION FOR AESTHETIC IMPROVEMENT OF FOOD AND BEVERAGE CONTAINERS

(71) Applicant: Diversey, Inc., Fort Mill, SC (US)

(72) Inventors: Kedar Chaudhari, Thane (IN); Aswini Patil, Mumbai (IN); Akanksha Sharma, Navi Mumbai (IN); Balaji Narayanan, Navi Mumbai (IN)

(73) Assignee: Diversey, Inc., Fort Mill, SC (US)

( * ) Notice: Subject to any disclaimer, the term of this patent is extended or adjusted under 35 U.S.C. 154(b) by 146 days.

(21) Appl. No.: 16/311,807

(22) PCT Filed: Jun. 28, 2017

(86) PCT No.: PCT/US2017/039682
§ 371 (c)(1),
(2) Date: Dec. 20, 2018

(87) PCT Pub. No.: WO2018/009387
PCT Pub. Date: Jan. 11, 2018

(65) Prior Publication Data
US 2020/0190359 A1 Jun. 18, 2020

(30) Foreign Application Priority Data
Jul. 4, 2016 (IN) .......................... IN201611022953

(51) Int. Cl.
| | |
|---|---|
| *C09D 191/00* | (2006.01) |
| *B65D 85/72* | (2006.01) |
| *C08K 5/092* | (2006.01) |
| *C08K 5/11* | (2006.01) |
| *C08K 5/101* | (2006.01) |
| *C08K 5/12* | (2006.01) |
| *C08K 5/09* | (2006.01) |
| *C08K 5/10* | (2006.01) |

(52) U.S. Cl.
CPC ........... *C09D 191/00* (2013.01); *B65D 85/72* (2013.01); *C08K 5/092* (2013.01); *C08K 5/101* (2013.01); *C08K 5/11* (2013.01); *C08K 5/12* (2013.01); *C08K 5/09* (2013.01); *C08K 5/10* (2013.01)

(58) Field of Classification Search
CPC ........ C09D 191/00; B65D 85/72; C08K 5/09; C08K 5/10; C08K 5/092; C08K 5/101; C08K 5/11; C08K 5/12; C08L 91/00
USPC ......................... 106/221, 227, 244, 243, 267
See application file for complete search history.

(56) References Cited

U.S. PATENT DOCUMENTS

| | | |
|---|---|---|
| 3,453,144 A | 7/1969 | Morgan et al. |
| 3,461,090 A | 8/1969 | Haynes et al. |
| 3,876,410 A | 4/1975 | Scholes |
| 4,374,879 A * | 2/1983 | Roberts ................... C03C 17/28 215/DIG. 6 |
| 4,603,067 A * | 7/1986 | Tani ..................... C09D 191/08 524/96 |
| 5,284,508 A | 2/1994 | Shibata et al. |
| 5,454,873 A | 10/1995 | Scholes et al. |
| 6,172,036 B1 | 1/2001 | Cruickshank |
| 6,288,012 B1 | 9/2001 | Li et al. |
| 6,835,702 B2 | 12/2004 | Herdt et al. |
| 9,856,965 B2 | 1/2018 | Ishiki et al. |
| 2002/0115573 A1 | 8/2002 | Person et al. |
| 2005/0288195 A1 | 12/2005 | Heenan |
| 2010/0031976 A1 | 2/2010 | Warkotsch et al. |
| 2010/0257676 A1 | 10/2010 | Shamayeli |
| 2012/0021963 A1 | 1/2012 | Kneipp |
| 2012/0301351 A1 | 11/2012 | Kapic et al. |
| 2015/0025177 A1 | 1/2015 | Karikari et al. |

FOREIGN PATENT DOCUMENTS

| | | |
|---|---|---|
| CN | 1191893 A | 9/1998 |
| EP | 0235961 | 9/1987 |
| EP | 0793711 | 4/2000 |
| EP | 1253192 | 10/2002 |
| EP | 1440141 | 8/2007 |
| EP | 2202209 A1 | 6/2010 |
| EP | 2336093 | 6/2011 |
| EP | 2365058 | 9/2011 |
| EP | 2115113 | 11/2012 |
| JP | 57179053 A | 11/1982 |
| JP | 59111947 A | 6/1984 |
| JP | 59116152 A | 7/1984 |
| JP | 59145258 A | 8/1984 |
| JP | 59145259 | 8/1984 |
| JP | 62128951 A | 6/1987 |
| WO | WO2014/192966 | 12/2014 |
| WO | WO2015/188103 | 12/2015 |
| WO | WO2018/035131 | 2/2018 |

OTHER PUBLICATIONS

Machine translation of JP S 145259, Aug. 1984.*
Machine translation of JP S 59 145258, Aug. 1984.*
Office Action issued on Indian Application No. 201611022953, dated Feb. 22, 2021, English translation provided.
International Search Report and Written Opinion for PCT/US2017/039682 dated Dec. 22, 2017.
International Search Report and Written Opinion for PCT/US2017/046968 dated Oct. 27, 2017.

\* cited by examiner (Continued)

*Primary Examiner* — Elizabeth D Wood
(74) *Attorney, Agent, or Firm* — Bell & Manning, LLC; N. Meredith Porembski

(57) ABSTRACT

A coating composition for use in recycled beverage containers is disclosed. An emulsification of oil, fatty acids, a sorbitan ester and an alkoxylated alcohol is disclosed. Methods directed to using the coating composition are also disclosed.

20 Claims, 2 Drawing Sheets

METHOD AND COMPOSITION FOR A STABLE OIL-IN-WATER EMULSION FOR AESTHETIC IMPROVEMENT OF FOOD AND BEVERAGE CONTAINERS

CROSS REFERENCE TO RELATED APPLICATIONS

This application is a National Stage of International Application No. PCT/US2017/039682 that was filed Jun. 28, 2017, the entire contents of which are herein incorporated by reference; which claims priority to Indian Patent Application No. IN201611022953 that was filed Jul. 4, 2016, the entire contents of which are herein incorporated by reference.

FIELD OF THE INVENTION

The present invention is in the technical field of food and beverage. More particularly, the present invention relates generally to a coating composition for scratches on beverage containers.

BACKGROUND

Containers, such as bottles, of beer, beverages, juice and mineral water are repeatedly used for several cycles. When repeatedly used, defects such as, scuff marks and scratches, are developed on the external surface of the containers. These defects are generated on the external surface due to mutual rubbing of the bottles in the filling and distribution process on the conveyor tract as well as during transit and distribution to customers while the containers are in crates. The defects decrease the aesthetic look of the containers and reduces brand image and decreases the commercial value of the product. The location of the defects on the containers depends on the design of the bottle. There can be one to several scuff rings and the width and depth of the scuff varies depending on the design of the bottles and the number of times the container has been recycled. The average width of the scuff marks can vary anywhere from 1 mm to 15 mm.

Common practice is to coat the containers or bottles with a coating composition during the recycling process. The coating composition is applied to the containers or bottles and covers the portion where the defect is located. Once applied, the coating composition masks the defects, thus enhancing the appearance of the beverage containers.

There is a need for a coating composition that coats the defects on the beverage containers without causing increased drying times to prevent a decrease in productivity during the recycling process. The coating composition would also be able to coat containers that have condensation while also coating dry containers.

SUMMARY OF THE INVENTION

The presently disclosed subject matter is directed to a method and composition for a stable oil-in-water emulsion for aesthetic improvement of food and beverage containers.

The composition may be a coating composition with 69 wt % to 85 wt % of a paraffin oil, 5 wt % to 21 wt % of a blend of unsaturated and saturated fatty acids, 1 wt % to 5 wt % of a sorbitan ester, and 1 wt % to 7 wt % of an alkoxylated alcohol.

In some embodiments, the presently disclosed subject matter may be directed to a method of making a coating composition. The method may include preparing a coating composition with 69 wt % to 85 wt % of a paraffin oil, 5 wt % to 21 wt % of a blend of unsaturated and saturated fatty acids, 1 wt % to 5 wt % of a sorbitan ester, and 1 wt % to 7 wt % of an alkoxylated alcohol. The method may also include mixing the coating composition with a diluting solvent to create an emulsification.

In other embodiments, the presently disclosed subject matter may be directed to a method of coating beverage containers. The method may include preparing a coating composition with 69 wt % to 85 wt % of a paraffin oil, 5 wt % to 21 wt % of a blend of unsaturated and saturated fatty acids, 1 wt % to 5 wt % of a sorbitan ester, and 1 wt % to 7 wt % of an alkoxylated alcohol. The method may also include mixing the coating composition with a diluting solvent to form an instant emulsion of the coating composition and the diluting solvent. The method may further include transferring the instant emulsion to at least one beverage container and coating at least one beverage container with the instant emulsion.

DETAILED DESCRIPTION OF THE INVENTION

Figure 1:
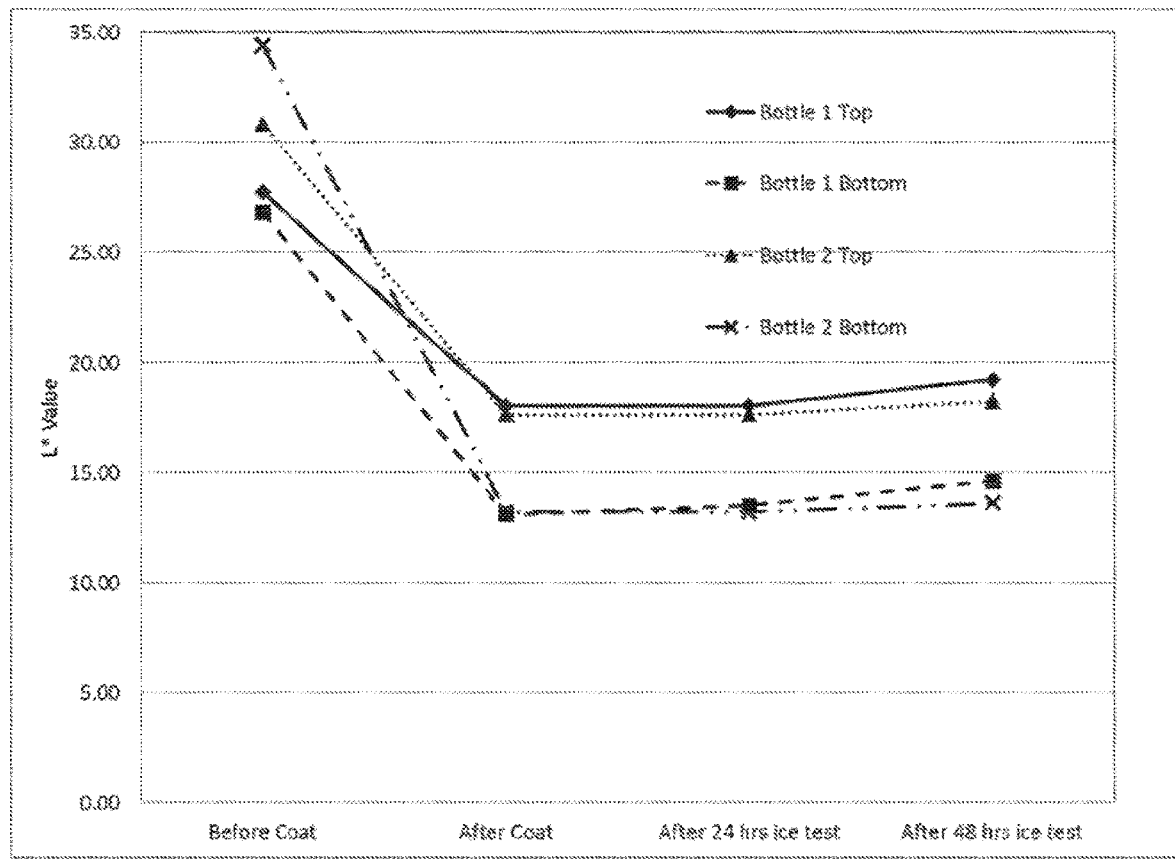
FIG. 1 displays the spectrocolorimeter reading (light fastness, L*) for bottles using sample 6.

The presently disclosed subject matter is directed to a coating composition. The coating composition may be a stable oil-in-water emulsion for aesthetic improvement of food and beverage containers. The coating composition may include a paraffin oil, a blend of unsaturated fatty acids and saturated fatty acids, at least one sorbitan ester and an alkoxylated alcohol.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a composition" includes a plurality of such compositions, and so forth.

Unless indicated otherwise, all numbers expressing quantities of components, reaction conditions, and so forth used in the specification and claims are to be understood as being modified in all instances by the term "about" Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, in some embodiments ±10%, in some embodiments ±5%, in some embodiments ±1%, in some embodiments ±0.5%, in some embodiments ±0.1%, and in some embodiments ±0.01% from the specified amount, as such variations are appropriated in the disclosed package and methods.

As used herein, the term "additive" refers to any substance, chemical, or compound that is added to an initial substance, chemical, or compound in a smaller amount than the initial substance, chemical, or compound to provide additional properties or to change the properties of the initial substance, chemical, or compound.

As used herein, the term "preservative" refers to any chemical or compound that prevents degradation or breakdown of a compound or composition. A preservative also prevents bacteria from spoiling a compound or composition during storage or use.

As used herein, the term "buffer" refers to any chemical, compound, or solution that is used to control the pH of a composition, system, or solution. A "buffer system" refers to any composition or system where there are two or more components that are used to control the pH of a composition, system, or solution, such as an acid and a base. The components are any chemical, compound, or solution.

As used herein, the term "recycled water" is inclusive of any water that has been used more than once. Recycled water is inclusive of water that has been treated such as waste water or wash water that is treated to remove solids and impurities. Recycled water can have anions, such as, for example sulphates and phosphates.

As used herein, the term "instant emulsification" refers to the emulsification of immiscible liquids that happens without any aid of external thermal or mechanical energy. Instant emulsification is spontaneous and occurs once the immiscible liquids come into contact.

All compositional percentages used herein are presented on a "by weight" basis, unless designated otherwise.

Although the majority of the above definitions are substantially as understood by those of skill in the art, one or more of the above definitions can be defined herein above in a manner differing from the meaning as ordinarily understood by those of skill in the art, due to the particular description herein of the presently disclosed subject matter.

The presently disclosed composition is directed to a coating composition. The coating composition may be comprised of a paraffin oil, unsaturated fatty adds, saturated fatty adds, a sorbitan ester, and an alkoxylated alcohol.

The coating composition may include a paraffin oil. The paraffin oil may be any liquid by-product of refining crude oil and can also be extracted from coal, wood and oil shale. Paraffin oil may be an alkane, a naphthenic oil, or an aromatic oil. Paraffin oil is a mineral oil and may sometimes also be called: white oil, liquid paraffin, or liquid petroleum. Paraffin is an alkane hydrocarbon and is referred to as paraffin oil in liquid form and paraffin wax in solid form. In some embodiments, the paraffin oil may be any of the above mentioned oils and can be of any grade, such as, for example light grade or heavy grade. In some embodiments, the coating composition may have 69 wt % to 85 wt % of a paraffin oil. In other embodiments, the coating composition may have 69 wt % of a paraffin oil, 70 wt % of a paraffin oil, 74 wt % of a paraffin oil, 75 wt % of a paraffin oil, 78 wt % of a paraffin oil, 79 wt % of a paraffin oil, 80 wt % of a paraffin oil, 82 wt % of a paraffin oil, 84 wt % of a paraffin oil, 85 wt % of a paraffin oil, 86 wt % of a paraffin oil, 88 wt % of a paraffin oil, 90 wt % of a paraffin oil, 95 wt % of a paraffin oil or any range between any of these values.

The coating composition may include unsaturated fatty acids. In some embodiments, the unsaturated fatty acids may be arachidonic acid, cyclo-pinolenic acid, dihomo gamma linoleic acid, eicosadienoic acid, eicosatrienoic acid, elaidic acid, erucic acid, gondoic acid, linoleic acid, linolenic add, myristoleic acid, nonadecanoic acid, nonadecyclic acid, oleic add, palmitoleic add, pinolenic add, sapienic acid, vaccenic add, their isomers and combinations thereof. In other embodiments, the unsaturated fatty acids may be a blend that has at least linoleic add and oleic acid.

The coating composition may include saturated fatty acids. In some embodiments, the saturated fatty acids may be anteiso-heptadecanoic acid, arachidic acid, behenic acid, caprylic acid, capric acid, cerotic acid, lauric acid, lignoceric acid, margaric add, myristic acid, nonadecanoic acid, nonadecyclic acid, palmitic acid, stearic acid, their isomers and combinations thereof. In other embodiments, the saturated fatty acids may be a blend that has at least anteiso-heptadecanoic acid, arachldic acid, margaric acid, palmitlc acid, stearic acid and any isomers thereof.

The coating composition may include a blend of unsaturated and saturated fatty acids. In some embodiments, the blend of unsaturated and saturated fatty acids may be tall oil. Tall oil is a byproduct of the paper and pulp industry that originates from pine trees. Crude tall oil is refined by fractional distillation and the fatty acids present in refined tall oil are predominantly 18-carbon, straight-chain mono- or diunsaturated fatty acids. Linoleic and oleic acid are the main unsaturated fatty acids present, with tall oil products having over 70% of these two fatty acids In some embodiments, the coating composition may have 5 wt % of a blend of unsaturated and saturated fatty acids, 6 wt % of a blend of unsaturated and saturated fatty acids, 7 wt % of a blend of unsaturated and saturated fatty acids, 8 wt % of a blend of unsaturated and saturated fatty acids, 9 wt % of a blend of unsaturated and saturated fatty acids, 10 wt % of a blend of unsaturated and saturated fatty acids, 12 wt % of a blend of unsaturated and saturated fatty acids, 14 wt % of a blend of unsaturated and saturated fatty acids, 15 wt % of a blend of unsaturated and saturated fatty acids, 16 wt % of a blend of unsaturated and saturated fatty acids, 18 wt % of a blend of unsaturated and saturated fatty acids, 20 wt % of a blend of unsaturated and saturated fatty acids, 21 wt % of a blend of unsaturated and saturated fatty acids, 22 wt % of a blend of unsaturated and saturated fatty acids, 24 wt % of a blend of unsaturated and saturated fatty acids, 25 wt % of a blend of unsaturated and saturated fatty acids, 26 wt % of a blend of unsaturated and saturated fatty acids, 28 wt % of a blend of unsaturated and saturated fatty acids, 30 wt % of a blend of unsaturated and saturated fatty acids or any range between any of these values. In other embodiments, the coating composition may have 5 wt % to 21 wt % of a blend of unsaturated and saturated fatty acids. In further embodiments, the coating composition may have 6 wt % to 20 wt % of a blend of unsaturated and saturated fatty acids. The coating composition may have 6 wt % of a blend of unsaturated and saturated fatty acids. The coating composition may have 10 wt % of a blend of unsaturated and saturated fatty acids. The coating composition may have 12 wt % of a blend of unsaturated and saturated fatty acids. The coating composition may have 20 wt % of a blend of unsaturated and saturated fatty adds.

The blend of unsaturated and saturated fatty acids may be present in varying ratios. The ratio of unsaturated fatty acids to saturated fatty acids depends on the tall oil source and the refinement process. In some embodiments, the coating composition may have a blend of unsaturated and saturated fatty acids at a ratio of 30:1 of unsaturated fatty acids to saturated fatty acids, a ratio of 29:1 of unsaturated fatty acids to saturated fatty adds, a ratio of 28.24:1 of unsaturated fatty acids to saturated fatty acids, a ratio of 28:1 of unsaturated fatty acids to saturated fatty acids, a ratio of 27:1 of unsaturated fatty acids to saturated fatty acids, a ratio of 26:1 of unsaturated fatty acids to saturated fatty acids, a ratio of 25:1 of unsaturated fatty acids to saturated fatty acids, a ratio of 20:1 of unsaturated fatty acids to saturated fatty acids, a ratio of 15:1 of unsaturated fatty acids to saturated fatty acids or any range between any of these values. In some embodiments, the coating composition may have a blend of unsaturated and saturated fatty acids at a ratio of 28.24:1 of unsaturated fatty acids to saturated fatty acids.

The coating composition may include a surfactant. Any surfactant may be used that can be mixed with oils to create an oil-in-water emulsion. The surfactant can be anionic, cationic, zwitterionic, or non-ionic. The surfactant may be a sorbitan ester, an alkoxylated alcohol or a phosphate ester. In some embodiments, the sorbitan ester may be a sorbitan monostearate, sorbitan tristearate, sorbitan monolaurate, ethoxylated sorbitan ester (polysorbate), propoxylated sorbitan ester, sorbitan monooleate 20 EO and combinations thereof. In some embodiments, the coating composition may include at least one sorbitan ester. The sorbitan ester may be sorbitan monooleate 20 EO, also known as Tween® 80.

In some embodiments, the coating composition may have 1 wt % to 10 wt % of a sorbitan ester. In other embodiments, the coating composition may have 1 wt % to 5 wt % of a sorbitan ester. In further embodiments, the coating composition may have 1 wt % of a sorbitan ester, 2 wt % of a sorbitan ester, 3 wt % of a sorbitan ester, 4 wt % of a sorbitan ester, 5 wt % of a sorbitan ester, 6 wt % of a sorbitan ester, 7 wt % of a sorbitan ester, 8 wt % of a sorbitan ester, 9 wt % of a sorbitan ester, 10 wt % of a sorbitan ester or any range between any of these values. The coating composition may have 1 wt % of a sorbitan ester. The coating composition may have 2 wt % of a sorbitan ester. The coating composition may have 3 wt % of a sorbitan ester. The coating composition may have 5 wt % of a sorbitan ester.

The coating composition may include an alkoxylated alcohol. The alkoxylated alcohol may have up to 10 moles of ethylene oxide. In some embodiments, the alkoxylated alcohol may have 2 to 4 moles of ethylene oxide. The alkoxylated alcohol may be an ethoxylated alcohol. The ethoxylated alcohol may be an ethoxylated lauryl alcohol. The ethoxylated alcohol may be an oxo alcohol ethoxylate. The ethoxylated lauryl alcohol may be polyoxyethylene 3 EO lauryl ether. In other embodiments, the alkoxylated alcohol may be EO/PO triblock copolymers, also known as Poloxamers.

In some embodiments, the coating composition may have 1 wt % to 10 wt % of an alkoxylated alcohol. In other embodiments, the coating composition may have 1 wt % to 7 wt % of an alkoxylated alcohol. In further embodiments, the coating composition may have 1 wt % of an alkoxylated alcohol, 2 wt % of an alkoxylated alcohol, 3 wt % of an alkoxylated alcohol, 4 wt % of an alkoxylated alcohol, 5 wt % of an alkoxylated alcohol, 6 wt % of an alkoxylated alcohol, 7 wt % of an alkoxylated alcohol, 8 wt % of an alkoxylated alcohol, 9 wt % of an alkoxylated alcohol, 10 wt % of an alkoxylated alcohol or any range between any of these values. The coating composition may have 5 wt % of an alkoxylated alcohol. The coating composition may have 6 wt % of an alkoxylated alcohol. The coating composition may have 7 wt % of an alkoxylated alcohol.

The coating composition may include a phosphate ester. The phosphate ester may be polyoxyethylene monooleyl ether phosphate, polyoxyethylene octadecenyl ether phosphate, polyoxyethylene tridecenyl ether phosphate and combinations thereof. In some embodiments, the phosphate ester may be polyoxyethylene octadecenyl ether phosphate. In some embodiments, the phosphate ester may be polyoxyethylene tridecenyl ether phosphate. In other embodiments, the phosphate ester may be Rhodafac D RS 610. In further embodiments, the phosphate ester may be Lubrhophos®. In other embodiments, the phosphate ester may be Rhodafac® RS 710.

In some embodiments, the coating composition may have 1 wt % to 5 wt % of a phosphate ester. In other embodiments, the coating composition may have 2 wt % to 4 wt % of a phosphate ester. The coating composition may have 1 wt % of a phosphate ester, 2 wt % of a phosphate ester, 3 wt % of a phosphate ester, 4 wt % of a phosphate ester, 5 wt % of a phosphate ester or any range between any of these values. In some embodiments, the coating composition may have 2 wt % of a phosphate ester. In other embodiments, the coating composition may have 3 wt % of a phosphate ester. In further embodiments, the coating composition may have 4 wt % of a phosphate ester.

In some embodiments, the coating composition may include a sorbitan ester and an alkoxylated alcohol. In some embodiments, the coating composition may include a sorbitan ester, an alkoxylated alcohol and a phosphate ester. In other embodiments, the coating composition may include a sorbitan ester and a phosphate ester. In further embodiments, the coating composition may include an alkoxylated alcohol and a phosphate ester.

The coating composition may include an additive. The additive may be a glycol ether, a biocide, a preservative, a perfume, an ester alcohol, a poloxamer or any combination thereof. In some embodiments, the coating composition may include at least one glycol ether. In other embodiments, the coating composition may include at least one biocide. In further embodiments, the coating composition may include a glycol ether and a biocide. The glycol ether may be dipropylene glycol methyl ether.

The additive may also be at least one solvent. In some embodiments, the at least one solvent may be water, polyethylene glycol, alcohol, ether, glycol ether, polyether and combinations thereof. In other embodiments, the solvent may be water.

In some embodiments, the coating composition may include 1 wt % to 5 wt % of at least one glycol ether. The coating composition may include 1 wt % to 3 wt % of at least one glycol ether. The coating composition may include 1 wt % of at least one glycol ether, 2 wt % of at least one glycol ether, 3 wt % of at least one glycol ether, 4 wt % of at least one glycol ether, 5 wt % of at least one glycol ether or any range between any of these values. In some embodiments, the coating composition may include 1 wt % of at least one glycol ether.

In some embodiments, the coating composition may include 0.01 wt % to 0.2 wt % of a biocide. The coating composition may include 0.01 wt % of a biocide, 0.02 wt % of a biocide, 0.05 wt % of a biocide, 0.1 wt % of a biocide, 0.12 wt % of a bocide, 0.14 wt % of a biocide, 0.15 wt % of a biocide, 0.2 wt % of a biocide or any range between any of these values. In other embodiments, the coating composition may include 0.01 wt % of a biocide. In further embodiments, the coating composition may include 0.1 wt % of a biocide. In yet further embodiments, the coating composition may include 0.2 wt % of a biocide.

The additive may also be at least one perfume. The perfume may provide an odor or fragrance that is appealable to a person or neutralize odors of a composition or of a product that may come in contact with the composition. The perfume may be any natural or synthetic perfume that is well known. For example, in some embodiments, the perfume may be a flower or herbal fragrance, such as rose extract, violet extract, and/or lavender extract; a fruit fragrance, such as lemon, lime, and/or orange; synthetic perfumes, such as musk ketone, musk xylol, aurantiol, and/or ethyl vanillin. The perfume may be from a wide variety of chemicals, such as aldehydes, ketones, esters, and the like.

The additive may be at least one preservative. In some embodiments, the preservative may be a carbamate, a quaternary ammonium compound, an alkyl amine, an isothiazoline and combinations thereof. The isothiazoline may be benzylisothiazolinone, 5-chloroisothiazolinone, methylisothiazolinone and combinations thereof. In other embodiments, the preservative may be 1,2-benzisothiazolin-3-one sodium salt and 3-iodo-2-propynyl butyl carbamate.

The lubricant composition may include 0.05 wt % of a preservative, 0.07 wt % of a preservative, 0.1 wt % of a preservative, 0.2 wt % of a preservative, 0.25 wt % of a preservative, 0.27 wt % of a preservative, 0.3 wt % of a preservative, 0.35 wt % of a preservative, 0.4 wt % of a preservative, 0.45 wt % of a preservative, 0.5 wt % of a preservative or any range between any of these values.

Methods of Making the Disclosed Composition

A method of making the coating composition may include preparing a coating composition with 69 wt % to 85 wt % of paraffin oil, 5 wt % to 21 wt % of a blend of unsaturated and saturated fatty acids, 1 wt % to 5 wt % of a sorbitan ester, and 1 wt % to 7 wt % of an alkoxylated alcohol. In one embodiment, the coating composition may include 78 wt % of a paraffin oil, 12 wt % of a blend of unsaturated and saturated fatty acids, 5 wt % of an alkoxylated alcohol, 4 wt % of a phosphate ester, and 1 wt % of a glycol ether. In another embodiment, the coating composition may include 78 wt % of a paraffin oil, 12 wt % of a blend of unsaturated and saturated fatty acids, 5 wt % of an alkoxylated alcohol, 4 wt % of a phosphate ester, and 1 wt % of a sorbitan ester. In another embodiment, the coating composition may include 80 wt % of a paraffin oil, 10 wt % of a blend of unsaturated and saturated fatty adds, 5 wt % of an alkoxylated alcohol, 3 wt % of a phosphate ester, and 2 wt % of a sorbitan ester. In a further embodiment, the coating composition may include 84 wt % of a paraffin oil, 6 wt % of a blend of unsaturated and saturated fatty acids, 7 wt % of an alkoxylated alcohol and 3 wt % of a sorbitan ester.

The method may also include mixing the coating composition with a diluting solvent to create an emulsification. The coating composition may be mixed with the diluting solvent by simple agitation, stirring, rocking, churning, blending, emulsifying, or any other means common to one of skill in the art. The emulsification may be an instant emulsification. The emulsification may be stable for 1 hour, 2 hours, 3 hours, 4 hours, 5 hours, 6 hours, 7 hours, 8 hours, 9 hours, 10 hours, 11 hours, 12 hours or any range between these values. In some embodiments, the emulsification may be stable up to 8 hours without additional mixing before application to a beverage container. In other embodiments the emulsification may be stable more than 8 hours without additional mixing before application to a beverage container.

In some embodiments, the diluting solvent may be a polar solvent, such as, for example, methanol, ethanol, isopropanol. In other embodiments, the diluting solvent may be water.

In some embodiments, the diluting solvent may be added at a ratio of 10:0.2 to 5:3 of diluting solvent to coating composition. In other embodiments, the diluting solvent may be added at a ratio of 9.25:0.75 to 8.5:1.5 of diluting solvent to coating composition. The diluting solvent may be added at a ratio of 9.25:0.75 of diluting solvent to coating composition, 9:1 of diluting solvent to coating composition, 8.75:1.25 of diluting solvent to coating composition, 8.5:1.5 of diluting solvent to coating composition, 8.25:1.75 of diluting solvent to coating composition, 8:1 of diluting solvent to coating composition and any range between any of these ratios. In one embodiment, the diluting solvent may be added at a ratio of 9:1 of diluting solvent to coating composition.

Methods of Using the Disclosed Composition

A method of coating beverage containers may include preparing a coating composition with 69 wt % to 85 wt % of a paraffin oil, 5 wt % to 21 wt % of a blend of unsaturated and saturated fatty adds, 1 wt % to 5 wt % of a sorbitan ester, and 1 wt % to 7 wt % of an alkoxylated alcohol. The coating composition may be placed in a storage tank or similar device.

The method may also include mixing the coating composition with a diluting solvent to form an instant emulsion of the coating composition and the diluting solvent. In some embodiments, the coating composition is mixed with the diluting solvent in a system based on the principle of online mixing. The online mixing is done within the system and is pumped directly to an applicator tool or similar device to apply onto at least one beverage container. In some embodiments, the emulsion may not be instant.

The method may further include transferring the instant emulsion to at least one beverage container and coating at least one beverage container with the instant emulsion. The instant emulsion may be transferred to at least one beverage container using an applicator tool. The coating composition may be pumped from a storage tank and dispensed from the applicator tool. The applicator tool may be an absorbent pad, a brush, a contact belt, a cotton cloth, filter paper, a roller, a spray device, a sponge, a super expulsion pad or tissue paper. The applicator tool may be made from canvas, rubber, foam, paper, plastic, wood or any other material well known to one of skill in the art. The applicator tool may be used for even distribution onto the beverage container.

The beverage containers may be bottles and/or cans. The beverage containers may be made from metal, glass, paper, cardboard, plastic and combinations thereof. In some embodiments, the beverage containers may include glass, plastic, polyethylene terephthalate (PET), polyethylene naphthalate (PEN) or polycarbonate (PC), boxes, crates, metal cans, vessels, refillable cans, boxes, crates, barrels or vessels, such as KEGs, paper and cardboard holders and combinations thereof. In some embodiments, the at least one beverage container may be at least one glass bottle. In other embodiments, the at least one beverage container may be at least one metal can. In further embodiments, the at least one beverage container may be at least one polyethylene terephthalate container.

The beverage containers may be of any shape. For example, the beverage containers may be in the shape of a circle, a cylinder, a diamond, an oval, a square, a rectangle, a pentagon, a hexagon, a heptagon, an octagon, a tube or combinations thereof.

Beverage containers are often filled at temperatures of 2° C.-8° C. The container may be dry or wet when they are filled. When the containers are filled with liquid, condensation may be present over the external surface of the beverage containers. The amount of condensation depends on the atmospheric temperature and humidity. The condensation will form droplets and drip down from the bottle surface. When a coating composition has a hydrophile-lipophile balance (HLB) value of 8 or above, it is said to form a stable emulsion when diluted with water. The water may be condensation on the external surface of the bottle. An HLB value of 8 or above creates a highly hydrophilic solution with good water solubility. When a coating composition is applied that has an HLB value of 8 or above on beverage containers filled with chilled liquids at 2° C.-8° C., the condensation present on the external surface of the beverage container will carry the coating and drip down from the bottle surface. As the condensation carries the coating composition down the bottle, the defects on the beverage containers are not coated and masked.

Fatty acids, their esters and oils have an HLB value less than 8. These fatty acids are often emulsified to get an HLB value of 8 and above. The product is diluted with water to get a stable emulsion and then applied to a beverage container to coat defects on the beverage container. When emulsified fatty acids, their esters and oils are used for coating, they will dissolve with the condensation and drip down off the bottle. It was determined that when neat fatty acids, their esters and oils were used for coating beverage containers with condensation present, the coating was able to retain on the glass surface and had good ice water resistance. When a coating composition with an HLB value of less than 8 is diluted with water, it forms a dispersion which has less stability and good water resistance after applying the composition to beverage containers with condensation present. The coating composition has a hydrophobic nature and an increased ability for the fatty acids (including fatty acid esters and oils) to remain on the bottle and coat the defects in the present of condensation. In some embodiments, the coating composition may have an HLB value less than 8. The coating composition may have an HLB value of 7, an HLB value of 6, an HLB value of 5, an HLB value of 4, an HLB value of 3, an HLB value of 2, an HLB value of 1 or any range between any of these values.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

EXAMPLES

The following Examples provide illustrative embodiments. In light of the present disclosure and the general level of skill in the art, those of ordinary skill in the art will appreciate that the following examples are intended to be exemplary only and that numerous changes, modifications, and alterations can be employed without departing from the scope of the presently disclosed subject matter.

Example 1

Comparison Testing of Speed of Emulsification Using Different Surfactants

Sample 1 and Sample 1c were prepared as described in Table 1 below. The samples had similar formulations, but with different surfactants. Sample 1 had an ethoxylated lauryl alcohol (polyoxyethylene 3 EO lauryl ether, Brij L3), while Sample 1c had an alkoxylated stearyl alcohol. Both surfactants were purchased from the same supplier, Croda. Diluted compositions of both samples were prepared by emulsifying each composition with water at a 1:9 ratio of composition to water for a final 10% dilution. The stability of the compositions and the speed of emulsification were tested for both samples.

TABLE 1

| Ingredients | Sample 1c | Sample 1 |
|---|---|---|
| Paraffin Oil | 84 wt % | 84 wt % |
| Tall Oil | 6 wt % | 6 wt % |
| Sorbitan Ester (Tween 80) | 3 wt % | 3 wt % |
| Surfactant | 7 wt % alkoxylated stearyl alcohol | 7 wt % ethoxylated lauryl alcohol |

The information for the formulation ingredients including tradename, supplier and features of each are included in Table 2 below:

TABLE 2

| Tradename | Supplier | Generic Name | Chemical Nature | Class | Density (g/cm$^3$) | Cloud Point |
|---|---|---|---|---|---|---|
| Brij L3 | Croda | Fatty Ethoxylated Alcohol | Polyoxyethylene 3 Lauryl Ether | Non-Ionic Surfactants | 0.90-0.93 | 52-55 deg C. |
| Tween 80 | Croda | Sorbitan Esters | Polyoxyethylene (20) sorbitan monooleate | Non-Ionic Surfactants | 1.07 | 65 deg C. |
| Rhodafac RS 610 | Solvay | Phosphate Ester | Ethoxylated Phosphate Ester | Anionic Surfactants | 1.06 | NA |
| Lubrhophos 400 | Solvay | Phosphate Ester | Ethoxylated Phosphate Ester | Anionic Surfactants | Paraffin Oil | NA |
| Light Liquid Paraffin Oil | Apar Industries | Paraffin Oil | Refined Mineral Oil | Oil | 0.82-0.87 | NA |
| For 2x | Forchem | Fatty Acid | Tall Oil Fatty Acid | Fatty Acid | 0.90 | NA |

The formula stability for sample 1 was very stable and was a clear liquid at room temperature. Sample 1c was unstable and had precipitation settling at room temperature. The emulsification stability at the 10% dilution in water was tested for both sample 1 and 1c. Sample 1 was very stable for 4 hours and the emulsion was free flowing with no precipitation settling observed. Sample 1c was unstable and precipitation was observed immediately after emulsification. In conclusion, it was observed that the use of ethoxylated lauryl alcohol in sample 1 provided better stability in the formula and at 10% dilution when compared to sample 1c with the alkoxylated stearyl alcohol.

Example 2

Comparison Testing of Drying Time Using Different Fatty Acids

Sample 1 and sample 2c were prepared as described in Table 3 below. The samples had similar formulations, but with different fatty acids. Sample 2c was prepared with oleic acid only, whereas sample 1 was prepared with tall oil. Both the oleic acid and tall oil were purchased from the same supplier, Forchem.

TABLE 3

| Ingredients | Sample 2c | Sample 1 |
|---|---|---|
| Paraffin Oil | 84 wt % | 84 wt % |
| Fatty Acid | 6 wt % Oleic acid | 6 wt % Tall oil |
| Sorbitan Ester (Tween 80) | 3 wt % | 3 wt % |
| Surfactant | 7 wt % alkoxylated stearyl alcohol | 7 wt % ethoxylated lauryl alcohol |

Tall oil is a blend of fatty acids, oleic and linoleic acid are the majority of the fatty acids present. The ingredients of tall oil are described in Table 4 below. The amount of free rosin and unsaponifiables in Table 4 will be equal to 2.4% and do not have an exact individual amount due to fractional distillation process variation. Diluted compositions of both samples were prepared by emulsifying each composition with water at a 1:9 ratio of composition to water for a final 10% dilution. The emulsified composition was applied on glass bottles using a sponge. The drying time of the emulsified composition on the glass bottles was measured based on transfer of the composition onto parchment paper and based on any residue felt on a tester's hands. The experimental room had a temperature of 34° C. with a relative humidity of 64%.

TABLE 4

| Ingredients | Wt % |
|---|---|
| 16:0 Palmitic Acid | 0.1 |
| 17:0 Anteiso-heptadecanoic acid | 0.6 |
| 17:0 Margaric acid | 0.3 |
| 18:0 Stearic acid | 3.3 |
| 18:1-9 Oleic acid | 29.8 |
| 18:2-5, 9 Linoleic Conjugate | 0.7 |
| 18:2-9, 12 Linoleic acid | 42.6 |
| 19:1-9 Nonadecanoic acid, undifferentiated | 0.7 |
| 18:3-5, 9, 12 Pinolenic acid | 6.4 |
| 18:3-9, 12, 15 Linolenic acid | 0.8 |
| Cyclopinolenic acid | 0.7 |
| 18:2 Linoleic conjugate | 7.3 |
| 20:0 Arachidic acid | 0.2 |
| 18:3 Linolenic acid conjugate | 0.4 |
| 20:1-11 Gondoic acid | 1.8 |
| 20:2-5, 11 Eicosadienoic acid | 0.2 |
| 20:2-11, 14 Eicosadienoic acid | 0.2 |
| 20:3-5, 11, 14 Eicosatrienoic acid | 1.1 |
| 20:3-7, 11, 14 Dihomogamma linoleic acid | 0.4 |
| Free rosin acids | 0.7-1.8 |
| Unsaponifiables | 0.6-1.7 |

Sample 1 had a drying time of approximately 60 seconds and sample 2c had a drying time of approximately 90 seconds. In conclusion, sample 2c had an increased drying time due to the use of oleic acid instead of tall oil, which was used in sample 1. Tall oil has 42.6% linoleic acid with other fatty acids as well, but it is believed that the large amount of linoleic acid reduced the drying time significantly.

Example 3

Comparison Testing of Speed of Emulsification Using Different Surfactant and Increased Fatty Acid Content Two different samples were tested to determine if changing the surfactant and increasing the fatty add content would affect the speed of emulsification. Sample 3 had 5 wt % ethoxylated lauryl alcohol and 10 wt % tall oil, sample 3c had 5 wt % alkoxylated stearyl alcohol and 10 wt % tall oil. A third sample, sample 3a, had the same formulation as sample 3c, but replaced the phosphate ester with 1 wt % sorbitan ester (tween 80) and 2 wt % alkoxylated stearyl alcohol. As mentioned above, the ethoxylated lauryl alcohol (polyoxyethylene 3 EO lauryl ether, Brij L3) and alkoxylated stearyl alcohol were purchased from the same supplier, Croda. Diluted compositions of all samples were prepared by emulsifying each composition with water at a 1:9 ratio of composition to water for a final 10% dilution. The stability of the compositions and the speed of emulsification were tested for all samples. The samples were prepared as described in Table 5 below.

TABLE 5

| Ingredients | Sample 3c | Sample 3 | Sample 3a |
|---|---|---|---|
| Paraffin oil | 80 wt % | 80 wt % | 80 wt % |
| Tall oil | 10 wt % | 10 wt % | 10 wt % |
| Sorbitan ester (Tween 80) | 2 wt % | 2 wt % | 3 wt % |
| Polyoxyethylene octadecenyl ether phosphate (Lubrhophos 400) | 3 wt % | 3 wt % | — |
| Alkoxylated stearyl alcohol | 5 wt % | — | 7 wt % |
| Ethoxylated lauryl alcohol | — | 5 wt % | — |

The formula stability for sample 3 was stable and was a clear liquid at room temperature. Sample 3c and sample 3a were unstable and had precipitation settling at room temperature. The emulsification stability at the 10% dilution in water was tested for all samples. Sample 3 was very stable for approximately 6 hours. Sample 3c was stable up to 2 hours with precipitation settling observed after 2 hours, but the settling was dissolved by heating the emulsification to 70'C. Once the temperature dropped below 70° C., the precipitation settling was observed again in sample 3c. Sample 3a was unstable with precipitation observed immediately after emulsification.

In conclusion, it was observed that phosphate ester aids with emulsion stability since the sample without a phosphate ester (sample 3a) had immediate precipitation during emulsification, but samples 3 and 3c had emulsion stability. It was also determined that alkoxylated stearyl alcohol is not a stable formula at room temperature since sample 3c had precipitation settling at room temperature. It is also determined that the phosphate ester works in synergy with ethoxylated lauryl alcohol to enhance the emulsion stability as sample 3 was found to be stable for approximately 6 hours, but sample 3c (alkoxylated stearyl alcohol instead of ethoxylated lauryl alcohol) was only stable up to 2 hours.

Example 4

Comparison Testing of Drying Time Using Different Fatty Acids at an Increased Content and a Phosphate Ester Sample 3 and Sample 4c were prepared as described in Table 6 below. The samples had similar formulations, but with different fatty acids. Sample 4c was prepared with oleic acid only, whereas sample 3 was prepared with tall oil. The ingredients of tall oil are described above in Table 4. Both the oleic acid and tall oil were purchased from the same supplier, Forchem. Diluted compositions of both samples were prepared by emulsifying each composition with water at a 1:9 ratio of composition to water for a final 10% dilution. The emulsified composition was applied on glass bottles using a sponge. The drying time of the emulsified composition on the glass bottles was measured based on transfer of the composition onto parchment paper and based on any residue felt on a testers hands. The experimental room had a temperature of 34° C. with a relative humidity of 64%.

TABLE 6

| Ingredients | Sample 4c | Sample 3 |
| --- | --- | --- |
| Paraffin oil | 80 wt % | 80 wt % |
| Fatty Acid | 10 wt % Oleic acid | 10 wt % Tall oil |
| Sorbitan ester (Tween 80) | 2 wt % | 2 wt % |
| Phosphate ester (polyoxyethylene octa decenyl ether phosphate, Lubrhophos 400) | 3 wt % | 3 wt % |
| Ethoxylated lauryl alcohol (polyoxyethylene 3 EO lauryl ether, Brij L3) | 5 wt % | 5 wt % |

Sample 3 had a drying time of approximately 60 seconds and sample 2c had a drying time of approximately 60 seconds. In conclusion, it is believed that the phosphate ester has concealed the faster drying time due to adding linoleic acid as was seen in Example 2.

Example 5

Comparison Testing of Speed of Emulsification Using Different Surfactant and High Content of Fatty Acids Sample 5 and Sample 5c were prepared as described in Table 7 below. The samples had similar formulations, but with different surfactants. Sample 5 had 20 wt % tall oil and an ethoxylated lauryl alcohol (Brj L3, polyoxyethylene 3 EO lauryl ether), while Sample 5c had 20 wt % tall oil and an alkoxylated stearyl alcohol. Both surfactants were purchased from the same supplier, Croda. Diluted compositions of both samples were prepared by emulsifying each composition with water at a 1:9 ratio of composition to water for a final 10% dilution. The stability of the compositions and the speed of emulsification were tested for both samples.

TABLE 7

| Ingredients | Sample 5c | Sample 5 |
| --- | --- | --- |
| Paraffin Oil | 70 wt % | 70 wt % |
| Tall Oil | 20 wt % | 20 wt % |
| Sorbitan Ester (Tween 80) | 5 wt % | 5 wt % |
| Surfactant | 5 wt % alkoxylated stearyl alcohol | 5 wt % ethoxylated lauryl alcohol |

The formula stability for sample 5 was stable and was a clear liquid at room temperature. Sample 5c was unstable and had precipitation settling at room temperature. The emulsification stability at the 10% dilution in water was tested for both samples 5 and 5c. Sample 5 was very stable for approximately 30-45 minutes and the emulsion was free flowing with no precipitation settling observed. Sample 5c was unstable and precipitation settling was observed immediately after emulsification. In conclusion, it was observed that the use of ethoxylated lauryl alcohol in sample 5 provided better stability in the formula and at 10% dilution when compared to sample 5c which had the alkoxylated stearyl alcohol.

Example 6

Spectrocolorimeter Analysis of Bottle Coating Using Sample 6

Sample 6 was prepared as described below in Table 8 Sample 6 was diluted with water at a ratio of 1:9 sample:water and produced an emulsified solution. Two glass bottles were filled with liquid. Two different tests were performed, test 1 with room temperature liquid filled bottles and test 2 with chilled liquid (2° C. to 8° C.) filled bottles where condensation was present on the bottle surface. The emulsified solution was applied to 2 bottles on the entire external surface of the bottles for both tests. A spectrocolorimeter was used to measure the scuffs (white rings on the external bottle surface) before and after the application of the emulsified solution. The scuffs were measured based on the whiteness of the scuffs and a whiteness value (L* value) was given. The higher the L* value, the greater the depth of the scuff. A decrease in L* value indicates that scuff was coated by the emulsified solution after coating the bottle. The measurements were taken before coating and after coating for the first test. Test 2 with the chilled liquid filled bottles and condensation was measured at 24 and 48 hours (24 hrs ice test, 48 hrs ice test, respectively).

TABLE 8

| Ingredients | Sample 6 |
| --- | --- |
| Light liquid paraffin oil | 84 wt % |
| Tall oil | 6 wt % |
| Polyoxyethylene 3 EO lauryl ether | 7 wt % |
| Sorbitan Ester (Tween 80) | 3 wt % |

The results are shown in FIG. 1, for both tests on bottle 1 and bottle 2. Bottle 1 had 27.7 and 26.8 for top and bottom L* values, respectively. Bottle 2 had 30.8 and 34.4 for top and bottom L* values, respectively. Both bottles had a significant decrease in L* value on both top and bottom after the coat of the emulsified solution. After the coating, Bottle 1 had 18.0 and 13.1 for top and bottom L values, respectively. After the coating, Bottle 2 had 17.6 and 13.2 for top and bottom L* values, respectively. Test 2 showed that bottles 1 and 2 were able to maintain almost the same value as the after coat even after the 24 hour ice test. The 48 hour ice test, only resulted in a slight increase in L* value for both bottles. Bottle 1 had a 48 hour ice test L* value of 19.2 and 14.6 for top and bottom, respectively. Bottle 2 had a 48 hour ice test L* value of 18.2 and 13.6 for top and bottom, respectively. In conclusion, the coating composition was able to coat the scuffs on the bottles even with condensation present on the bottles. The coating composition resulted in a significant decrease in L* value for bottles 1 and 2 on the top and bottom scuffs.

Example 7

Spectrocolorimeter Analysis of Bottle Coating Using Sample 7

Sample 7 was prepared as described below in Table 9. Sample 7 was diluted with water at a ratio of 1:9 sample:water and produced an emulsified solution. Two glass bottles were filled with liquid. Two different tests were performed, test 1 with room temperature liquid filled bottles and test 2 with chilled liquid (2° C. to 8'C) filled bottles where condensation was present on the bottle surface. The emulsified solution was applied to 2 bottles on the entire external surface of the bottles for both tests. A spectrocolorimeter was used to measure the scuffs (white rings on the external bottle surface) before and after the application of the emulsified solution. The scuffs were measured based on the whiteness of the scuffs and a whiteness value (L* value) is given. The higher the L* value, the greater the depth of the scuff. A decrease in L* value indicates that scuff was coated by the emulsified solution after coating the bottle. The measurements were taken before coating and after coating for the first test. Test 2 with the chilled liquid filled bottles and condensation was measured at 24 and 48 hours (24 hrs ice test, 48 hrs ice test, respectively).

TABLE 9

| Ingredients | Sample 7 |
| --- | --- |
| Light liquid paraffin oil | 80 wt % |
| Tall oil | 10 wt % |
| Polyoxyethylene 3 EO lauryl ether | 5 wt % |
| Polyoxyethylene octadecenyl ether phosphate (Lubrhophos 400) | 3 wt % |
| Sorbitan Ester (Tween 80) | 2 wt % |

Figure 2:
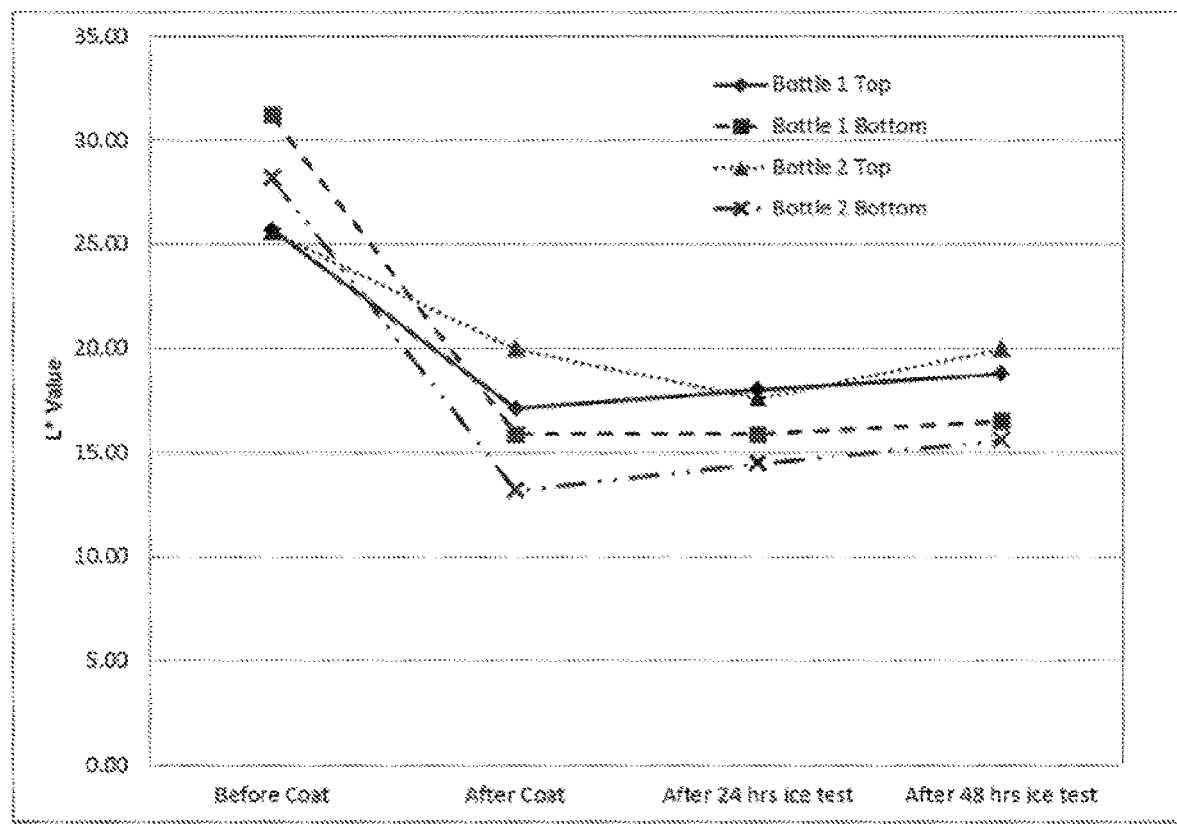
FIG. 2 displays the spectrocolorimeter reading (light fastness, L*) for bottles using sample 7.

The results are shown in FIG. 2, for both tests on bottle 1 and bottle 2. Bottle 1 had 25.7 and 31.2 for top and bottom L* values, respectively. Bottle 2 had 25.6 and 28.2 for top and bottom L* values, respectively. Both bottles had a decrease in L* value on both top and bottom after the coat of the emulsified solution. After the coating. Bottle 1 had 17.1 and 15.9 for top and bottom L* values, respectively. After the coating, Bottle 2 had 20.0 and 13.2 for top and bottom L* values, respectively. Test 2 showed that bottle 1 had almost the same values as the after coat in test 1. Bottle 1 had a 24 hour ice test L* value of 18.0 and 15.9 for top and bottom, respectively. Test 2 showed that the top of the bottle had a further decrease in L* value after the 24 hour ice test, but the bottom had a slight increase in L* value. Bottle 2 had a 24 hour ice test L* value of 17.6 and 14.5 for top and bottom, respectively. The 48 hour ice test, resulted in almost the same L values for both bottles, with bottle 2, top having a slightly higher increase which was the same L* value as test 1, after coat. Bottle 1 had a 48 hour ice test L* value of 18.8 and 16.5 for top and bottom, respectively. Bottle 2 had a 48 hour ice test L* value of 20.0 and 15.6 for top and bottom, respectively. In conclusion, the coating composition was able to coat the scuffs on the bottles even with condensation present on the bottles. The coating composition did have a decrease in L* value for bottles 1 and 2 on the top and bottom scuffs. However, overall sample 7 did not have as large of a decrease in L* value after coating (except bottle 1, bottom), and Sample 6 had a better coating with lower L* values during both ice tests (except bottle 1, top).

We claim:

1. A coating composition for coating beverage containers comprising:
   - 69 wt % to 85 wt % of a paraffin oil;
   - 5 wt % to 21 wt % of a blend of unsaturated and saturated fatty acids;
   - 1 wt % to 5 wt % of a sorbitan ester; and
   - 1 wt % to 7 wt % of an alkoxylated alcohol.

2. The coating composition of claim 1, wherein the unsaturated fatty acid of the blend is at least one member selected from the group consisting of arachidonic acid, cyclo-pinolenic acid, dihomo gamma linoleic acid, eicosadienoic acid, eicosatrienoic acid, elaidic acid, erucic acid, gondoic acid, linoleic acid, linolenic acid, myristoleic acid, nonadecanoic acid, oleic acid, pinolenic acid, sapienic acid and any isomers thereof.

3. The coating composition of claim 1, wherein the saturated fatty acid of the blend is at least one member selected from the group consisting of anteiso-heptadecanoic acid, arachidic acid, caprylic acid, capric acid, cerotic acid, lauric acid, margaric acid, myristic acid, palmitic acid, stearic acid and any isomers thereof.

4. The coating composition of claim 1, wherein the blend comprises linoleic acid and oleic acid.

5. The coating composition of claim 4, wherein the blend further comprises at least one member selected from the group consisting of anteiso-heptadecanoic acid, arachidic acid, margaric acid, palmitic acid, stearic acid and any isomers thereof.

6. The coating composition of claim 1, wherein the alkoxylated alcohol is an ethoxylated lauryl alcohol.

7. The coating composition of claim 6, wherein the ethyoxylated lauryl alcohol comprises 2 to 4 moles of ethylene oxide.

8. The coating composition of claim 1, further comprising 2 wt % to 4 wt % of a phosphate ester.

9. The coating composition of claim 8, wherein the phosphate ester is polyoxyethylene octadecenyl ether phosphate or polyoxyethylene tridecenyl ether phosphate.

10. The coating composition of claim 1, further comprising 1 wt % to 3 wt % of at least one glycol ether.

11. The coating composition of claim 10, wherein the at least one glycol ether is dipropylene glycol methyl ether.

12. A method of making an emulsified coating composition for coating beverage containers, the method comprising:
    contacting a coating composition comprising 69 wt % to 85 wt % of a paraffin oil, 5 wt % to 21 wt % of a blend of unsaturated and saturated fatty acids, 1 wt % to 5 wt % of a sorbitan ester, and 1 wt % to 7 wt % of an alkoxylated alcohol with a diluting solvent to create an emulsification.

13. The method of claim 12, wherein the emulsification is an instant emulsification.

14. The method of claim 12, wherein the emulsification is stable up to 8 hours without additional mixing before application to a beverage container.

15. The method of claim 12, wherein the diluting solvent is added at a ratio of 10:0.25 to 5:3 of diluting solvent to coating composition.

16. The method of claim 12, wherein the diluting solvent is water.

17. A method of coating beverage containers, the method comprising:
- contacting a coating composition comprising:
  - 69 wt % to 85 wt % of a paraffin oil;
  - 5 wt % to 21 wt % of a blend of unsaturated and saturated fatty acids;
  - 1 wt % to 5 wt % of a sorbitan ester; and
  - 1 wt % to 7 wt % of an alkoxylated alcohol;
- with a diluting solvent to form an instant emulsion of the coating composition and the diluting solvent;
- transferring the instant emulsion to at least one beverage container; and
- coating at least one beverage container with the instant emulsion.

18. The coating composition of claim 1, wherein the blend comprises linoleic acid and oleic acid, the alkoxylated alcohol is an ethoxylated lauryl alcohol, the sorbitan ester is sorbitan monooleate 20 ethylene oxide (EO), and optionally, the coating composition further comprises 2 wt % to 4 wt % of polyoxyethylene octadecenyl ether phosphate or polyoxyethylene tridecenyl ether phosphate.

19. The coating composition of claim 18, wherein the coating composition comprises 78 wt % to 85 wt % of the paraffin oil; 5 wt % to 14 wt % of the blend; 1 wt % to 4 wt % of the sorbitan ester; and 4 wt % to 7 wt % of the alkoxylated alcohol.

20. The coating composition of claim 19, wherein the linoleic acid and the oleic acid account for over 70 wt % of the blend.

* * * * *